United States Patent [19]

Nomura

[11] Patent Number: 5,092,443

[45] Date of Patent: Mar. 3, 1992

[54] CLUTCH DISC ASSEMBLY

[75] Inventor: Kunihiro Nomura, Neyagawa, Japan

[73] Assignee: Kabushiki Kaisha Daikin Seisakusho, Osaka, Japan

[21] Appl. No.: 666,819

[22] Filed: Mar. 8, 1991

[30] Foreign Application Priority Data

Mar. 28, 1990 [JP] Japan ................ 2-32339[U]

[51] Int. Cl.$^5$ ............ F16D 69/00; F16D 13/64
[52] U.S. Cl. ................ 192/107 M; 192/52; 192/107 R; 192/113 R
[58] Field of Search .......... 192/107 R, 107 M, 113 R, 192/70.12, 70.14, 52

[56] References Cited

U.S. PATENT DOCUMENTS

| 1,883,682 | 10/1932 | Gamble | 192/52 |
| 2,096,365 | 10/1937 | Spase | 192/107 R |
| 2,916,123 | 12/1959 | Garmager | 192/107 R |
| 3,280,949 | 10/1966 | Ross | 192/107 R |
| 3,599,766 | 8/1971 | Ely et al. | 192/107 R |
| 3,613,851 | 10/1971 | Ely et al. | 192/107 R |
| 3,726,374 | 4/1973 | Warren et al. | 192/107 R |
| 4,830,164 | 5/1989 | Hays | 192/107 R |

*Primary Examiner*—Richard Lorence
*Attorney, Agent, or Firm*—Armstrong, Nikaido, Marmelstein, Kubovcik & Murray

[57] ABSTRACT

In a clutch disc assembly in which facings comprising cerametallic pads stuck to one faces of back plates are secured to both faces of a plate at an outer peripheral part of the clutch disc, a heat insulating material having a thickness which increases from the radial inside to the radial outside is held between the above-mentioned plate at the outer peripheral part and at least one back plate of a facing so that failure in engagement and disengagement of clutch can be avoided by preventing a strain caused by heat to be produced on the part of plate on which the facings are provided.

1 Claim, 3 Drawing Sheets

CLUTCH DISC ASSEMBLY

BACKGROUND OF THE INVENTION

1. Industrial Useful Field

This invention relates to a clutch disc assembly and, more particularly, to a clutch disc assembly having cerametallic pad facings.

2. Prior Art

FIG. 6 is a vertical sectional view of a prior art clutch disc having facings on an outer peripheral part thereof. In FIG. 6, 1 is a cerametallic pad and 2 a back plate onto which such pad 1 is affixed over the entire rear surface of such pad. The pad 1 and the back plate 2 are sintered integrally and compose a facing 3. 4 is a clutch plate to which facings 3 are secured, by rivets 5, to opposite surfaces of such clutch plate 4, respectively. The facings 3 are secured to the clutch plate 4 in such manner that back plates 2 directly contact clutch plate 4.

PROBLEMS TO BE SOLVED BY THE INVENTION

In the above prior art structure, heat generated in the pad 1, upon engagement and disengagement of the clutch, is easily transferred through back plate 2 to clutch plate 4 because pad 1 is made of a cerametallic material having a large heat transfer coefficient. For this reason, strains are produced on the clutch plate 4 and cause failures in engagement and disengagement of the clutch, especially the disengagement, thereof.

An object of the invention, is to provide a clutch disc assembly which avoids failure in engagement and disengagement by preventing strain, caused by heat, from being produced on the part of the plate on which the facings are provided.

SUMMARY OF THE INVENTION

In a clutch disc assembly, in which facings, comprising cerametallic pads affixed to one face of back plates are secured to opposite faces of a clutch plate at an outer part of a clutch disc, with a heat insulating material held between such plate and at least one back plate of the facing.

In this invention, the cerametallic pad is insulated from the back plate and heat transfer to the plate is limited.

DETAILED DESCRIPTION OF THE INVENTION

Figure 1:
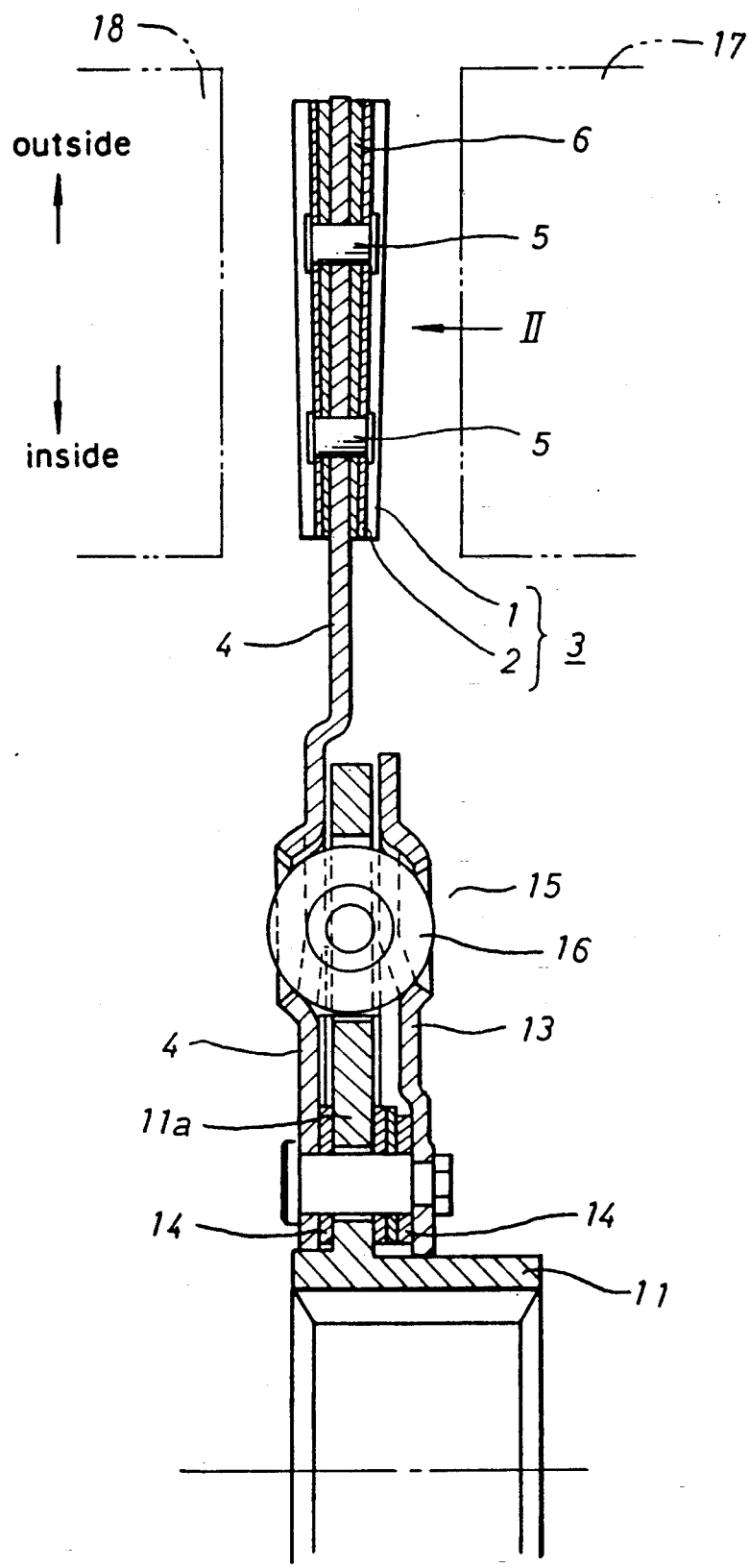
FIG. 1 is a vertical sectional partial view showing the clutch disc assembly of this invention.

An embodiment of this invention will be described hereunder with reference to attached drawings. A disc-like annular flange 11a, protruding outwardly in a radial direction of clutch, is formed on an output side spline hub 11. A pair of side plates (a clutch plate 4 and a retaining plate 13) are disposed at opposite sides of flanges 11a through friction washers 14, respectively, so as to be separated in axial direction on opposite sides of flange 11a. 15 are holes penetrating flange 11a and side plates in the axial direction. Holes 15 are in the radial direction, with torsion springs 16 in holes 15.

Figure 2:
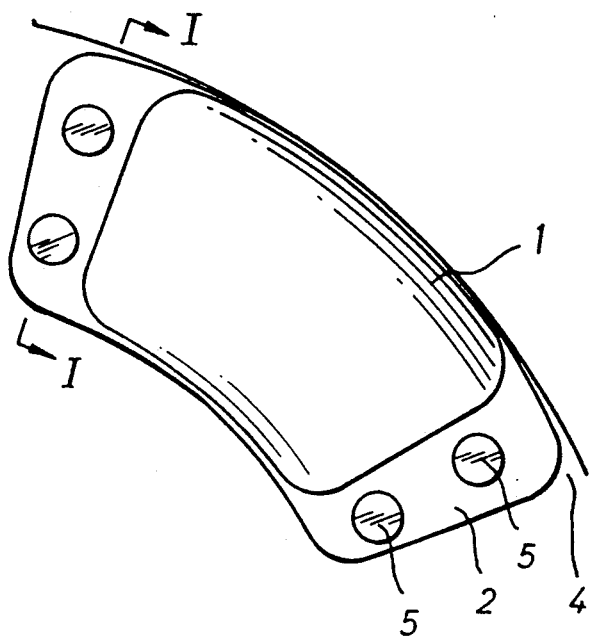
FIG. 2 is an elevational view in the direction of arrow II of FIG. 1.

Clutch plate 4 extends beyond retaining plate with facings 3 on opposite faces of clutch plate 4 beyond the end of retaining plate 13. Each facing 3 is composed of a cerametallic pad 1 and a back plate 2 as in the prior art. As illustrated in FIG. 2, the radial length of the pad 1 is shorter than that of back plate 2, and back plate 2 is crimped by each two rivets 5 to clutch plate 4 at its opposite ends. In this embodiment, the facing 3 is secured, by rivets 5, to the clutch plate 4 with an insulating material 6, having the same shape as the back plate 2 held between facing 3 and clutch plate 4. The radial thickness of insulating material 6, as best shown in FIG. 1, increases from inside to outside in the radial direction. As shown in FIG. 1, the clutch disc assembly, in operation, is mounted between pressure plate 17 and flywheel 18.

Function will be described hereunder. When facings 3, in clutch operation, are pressed on flywheel 18 by pressure plate 17, torque from flywheel 18 is transmitted to hub 11 and an output shaft (not shown) through facings 3, the clutch plate 4, the retaining plate 13, the torsion springs 16, the friction washers 14, and flange 11a. Heat is generated in pads 1 of the facings 3 due to the pressure-contact between the pressure plate 17 and the flywheel 18 and the tongue transmitted therethrough. Such heat is insulated from clutch plate 4 by heat insulating material 6. Strain due to heat in the clutch plate is reduced 4. Axial clearance between surface of pad 1 and pressure plate 17 and flywheel 18 is smaller at the radial outside than at the radial inside side because of the change in thickness of the insulating material 6. For this reason, the facings 3 will press on the pressure plate 17 and the flywheel 18 gradually from the radial outside to the radial inside. Consequently, torque capacity transmission is increased.

EFFECT OF THE INVENTION

According to the clutch disc assembly of the present invention, as described above, the heat insulating material 6 is held between the clutch plate 4 and the back plate 2 of the facing 3, so that the heat generated in the pad 1 is prevented from being transferred to the clutch plate 4 so as to eliminate the development of strain in the clutch plate 4. Releasability in engagement and disengagment of the clutch, especially in disengaging operation of the clutch, is improved. Further, the thickness of the insulating material 6 becomes larger from the radial inside of the clutch to the radial outside. Thus, the facings 3 can be pressed on the pressure plate 17 and the flywheel 18 gradually from the radial outside to the radial inside and transmission torque capacity is increased.

ANOTHER EMBODIMENT

Figure 3:
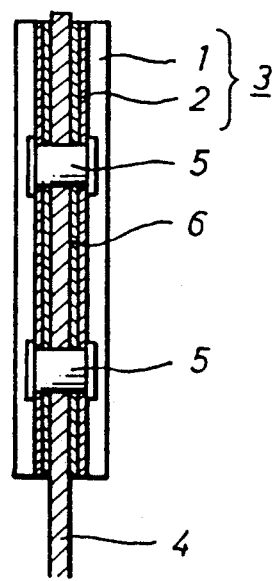
FIG. 3 is a sectional view of the clutch facing position of the assembly and showing another embodiment.

As shown in FIG. 3, the strain can be prevented from being produced in the clutch plate 4 even if the thickness of the heat insulating material 6 is made uniform.

Figure 4:
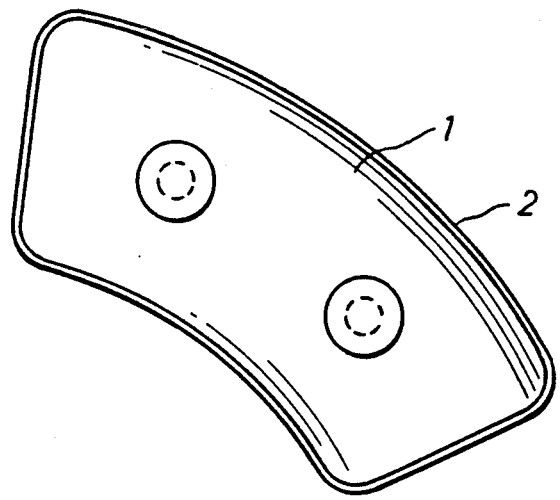
FIG. 4 is an elevational view of the pad of FIG. 3.

Further, as illustrated in FIG. 1, the pad 1 may be larger that back plate 2 or as illustrated in FIG. 4, the pad 1 may be formed in an approximately the same size as back plate 2.

Figure 5:
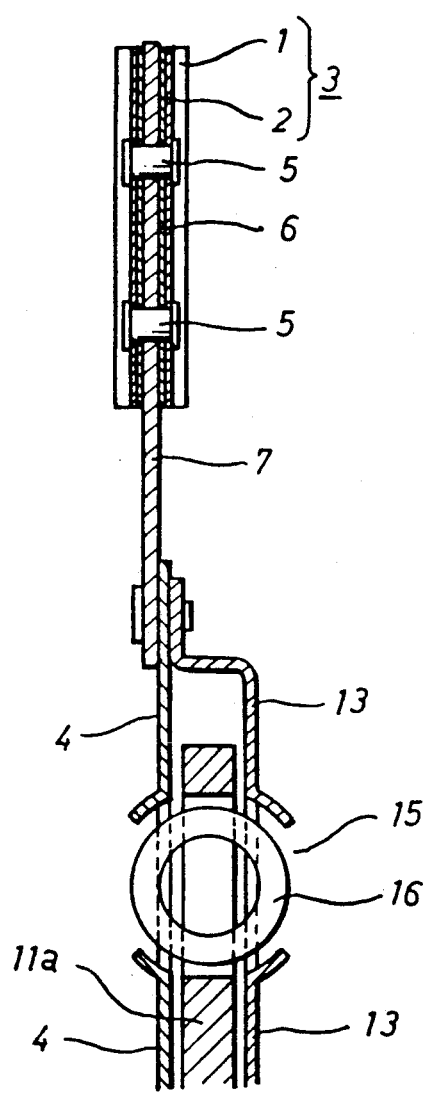
FIG. 5 is a view showing another embodiment of invention.
Figure 6:
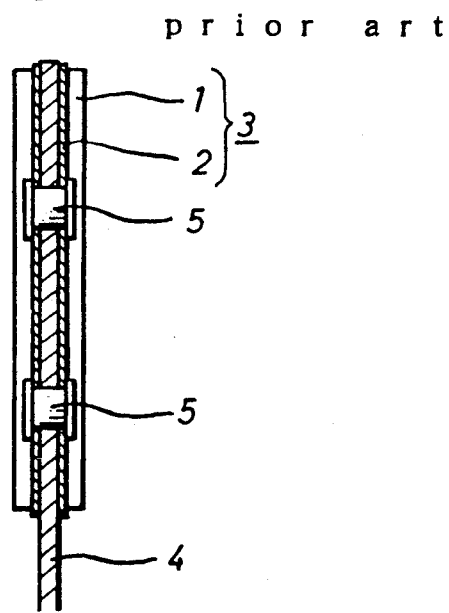
FIG. 6 is a vertical sectional partial view showing a clutch disc assembly of the prior art.

Moreover, the above-mentioned structure in which the facing 3 is secured along with insulating material 6 may be applied to a driven plate 7, as shown in FIG. 5.

What is claimed is:

1. A clutch disc assembly in which facings comprising cerametallic pads secured to back plates are secured to opposite faces of a plate at an outer peripheral part of a clutch disc, characterized by that a heat insulating material is held between said plate and a back plate on said opposite faces, said insulating material having a thickness gradually increasing from a radial inside to a radial outside of said clutch disc.

* * * * *